(12) United States Patent
Gawehn

(10) Patent No.: US 7,455,471 B2
(45) Date of Patent: Nov. 25, 2008

(54) ECCENTRIC CONICAL FASTENING SYSTEM

(75) Inventor: Eric Gawehn, Mountain View, CA (US)

(73) Assignee: Eric M. Gawehn, Mountain View, CA (US)

( * ) Notice: Subject to any disclaimer, the term of this patent is extended or adjusted under 35 U.S.C. 154(b) by 197 days.

(21) Appl. No.: 11/132,054

(22) Filed: May 17, 2005

(65) Prior Publication Data

US 2006/0039749 A1  Feb. 23, 2006

Related U.S. Application Data

(60) Provisional application No. 60/572,916, filed on May 19, 2004.

(51) Int. Cl.
*F16B 2/14* (2006.01)
(52) U.S. Cl. .............. 403/374.4; 403/408.1; 403/409.1; 16/2.1; 411/76; 411/398
(58) Field of Classification Search ............. 403/374.1, 403/374.2, 374.3, 408.1, 409.1, 374.4; 411/2, 411/354, 398, 76; 16/2.1
See application file for complete search history.

(56) References Cited

U.S. PATENT DOCUMENTS

| | | | | |
|---|---|---|---|---|
| 2,216,208 A | * | 10/1940 | Michon ..................... 83/690 |
| 2,860,015 A | | 11/1958 | Matterson ..................... 308/62 |
| 3,006,443 A | * | 10/1961 | Siler ..................... 403/408.1 |
| 3,385,624 A | | 5/1968 | Baclini ..................... 292/341.18 |
| 4,048,898 A | * | 9/1977 | Salter ..................... 411/44 |
| 4,749,898 A | | 6/1988 | Suzuki et al. ..................... 310/114 |
| 4,869,632 A | * | 9/1989 | Radtke ..................... 403/408.1 |
| 4,911,417 A | | 3/1990 | Short ..................... 267/256 |
| 5,141,357 A | | 8/1992 | Sherman et al. ..................... 403/408.1 |
| 5,387,047 A | | 2/1995 | Korpi ..................... 403/4 |
| 6,053,655 A | * | 4/2000 | Mazhar ..................... 403/408.1 |
| 6,712,544 B2 | * | 3/2004 | Kruger et al. ..................... 403/408.1 |
| 7,037,027 B2 | * | 5/2006 | Steinbeck ..................... 403/408.1 |

* cited by examiner

*Primary Examiner*—Michael P Ferguson
(74) *Attorney, Agent, or Firm*—Lumen Patent Firm

(57) ABSTRACT

Fastening systems for parts that endure high vibration shear loads have traditionally been difficult or expensive to produce. This application describes a fastening system with multiple conical surfaces and eccentric offsets. The novel conical fastener system allows parts to be assembled with reduced tolerance controls at interface features while improving alignment precision. The eccentric conical fastening system is particularly well suited for assemblies with high shear loads in high vibration/shock environments, and/or for systems that have extremely precise pointing requirements.

8 Claims, 15 Drawing Sheets

ECCENTRIC CONICAL FASTENING SYSTEM

CROSS-REFERENCE TO RELATED APPLICATIONS

This application claims priority under 35 U.S.C. §119(e) to provisional application No. 60/572,916 filed on May 19, 2004 titled "Nested Off-Center Conical Bushings for Alignment of Any Number of Non-Aligned Features."

STATEMENT REGARDING FEDERALLY SPONSORED RESEARCH OR DEVELOPMENT

The present invention was supported in part by contract DE-AC02-76SF00515 from the Department of Energy. The U.S. Government has certain rights in the invention.

FIELD OF INVENTION

The invention relates to eccentric mechanical fastening systems, and, more particularly, to eccentric fastening systems with conical surfaces.

BACKGROUND OF THE INVENTION

When fastening two or more items together with greater than or equal to two fasteners, issues of non-alignment arise. Typically, adjustment of tolerances can yield a set of parts that can be assembled. In high vibration environments (i.e., launch vehicles, high speed trains, racecars, hammer mills, steel recyclers, etc) shear joints are required and are typically designed with very tight tolerances to prevent relative motion between the parts of an assembly. In most cases, these parts must be match machined to achieve desired tolerance control. Tolerance control processes can be very expensive, particularly when match machining of large parts too very tight tolerances is involved.

FIG. 1 shows a prior art eccentric cylinder. The cylinder 102 has an outer cylindrical surface 106 and an inner cylindrical hole 104. The axes of the hole 104 and the outer surface 106 are parallel but not aligned. Therefore, the hole 104 is eccentric relative to the outer cylindrical surface 106. Rotation of the type of bushing shown in FIG. 1 does not allow alignment to a desired center.

FIG. 2 shows the eccentric elements shown in FIG. 1 as part of a prior art fastening system. The eccentric cylinder 102 allows misalignments between fastening features in a first part 202 and a second part 204 to be compensated for. Unfortunately, the range of adjustment of the position of the hole one of four relative to the parts 202, 204 is extremely limited. It should be fairly obvious that unless the misalignments between the parts 202, 204 is exactly the amount of the eccentric offset off the eccentric cylinder 102, then the axis of the hole 104 will be misaligned relative to a fastening feature of the second part 204. Thus, when a bolt is securely fastened with a nut through the assembly, it is highly likely that the bolt will experience bending stresses. Cyclic bending stress can cause fatigue, which can significantly reduce material strength properties.

FIG. 3 shows a prior art double eccentric cylindrical system. The two piece double eccentric system overcomes the misalignments issues found with a single eccentric cylindrical fastening system shown in FIGS. 1 and 2. The eccentric cylinder 102 with offset hole 104 is shown. Also shown is a second eccentric cylinder 302. The second eccentric cylinder 302 has an inner cylindrical surface 304 and an outer cylindrical surface 306. The axis of the inner cylindrical surface 304 and the axis of the outer cylindrical surface 306 are parallel, but offset. Thus, the inner and outer cylindrical surfaces 304, 306 are eccentric. The outer cylindrical surface 106 of the first eccentric cylinder 102 fits inside of the inner cylindrical surface 304 of the second eccentric cylinder 302.

The two piece double eccentric cylindrical system shown in FIG. 3 allows the location of the hole 104 to be positioned anywhere from the axis of the outer cylindrical surface 306 to a combination of the eccentric offsets away from that axis. Thus, problems with fastener bending stresses and other issues with misalignments between parts and fastening features can be greatly reduced.

Unfortunately, the prior art double eccentric cylindrical fastening system shown in FIG. 3 has several disadvantages. First of all, the machining tolerances required for both the first and second eccentric cylinders 102, 302 and that of the parts to be fastened together are quite high. It is very difficult to machine all of the features required to allow parts to be assembled while achieving a zero clearance joint.

When the assembled parts are used in a high vibration environment, the combination of excess clearances in the prior art fastening schemes can allow the parts to move relative to each other. In many instances this movement is unacceptable.

Prior art cylindrical bushings with offset axes for their outside versus inside diameters allows for rotational adjustment of the bushings to find a desired center (i.e., axis of fastener or vault hinge pin). To prevent the bushings from rotating, it is understood that the prior art relies on friction at the perpendicular faces of the bushings/fixed parts or on tack welding the bushings together and to the fixed part after completion of the alignment process. This may be tolerable for a lightly loaded static joint (i.e., a joint that does not experience cyclic or fluctuating loads).

Experience with high vibration environments has shown that friction alone can not be relied upon to hold joints together. Under high vibration/shock loads, effective fastener preload is reduced with a corresponding reduction in friction forces. As friction forces reduce, the joint begins slipping back and forth in a cyclic fashion; this can lead to fatigue and subsequent catastrophic failure (i.e., broken parts). Tack welding prevents motion under light cyclic loads. Load management can be increased with deeper weld penetrations, but it is impractical to achieve a full penetration welds with current practice. In addition, welding induces internal stresses that cause dimensional changes to the parts being welded and can alter the desired alignment of the joint. If tack welding is done incorrectly, rework of the joint can be impractical.

Thus, there is a need for a fastening system that does not require super high tolerance machining of large parts, that works well in high vibration and/or shock environments and that can provide a means of adjustment in the field.

SUMMARY OF THE INVENTION

In view of the above, it is a primary object of the present invention to provide a fastening system that is adjustable, that does preferably not allow clearance toward joint slippage, that does not induce bending stress into joint fasteners, that can be pre-loaded to benefit from energy storage in the joint, and that is affordable to produce.

One advantage to the system is that it greatly reduces the need for high specification tolerance control and machining of large parts, reduces the need for high specification tolerance control and machining to small parts, and, therefore reduces the overall cost of the system.

Another advantage to the system is that the system may be designed such that the conical elements lock in place after tightening the fastener to a final specification that results in an almost ideally perfect shear joint.

Another advantage to the system is that the system may be designed such that the conical elements can easily come apart with relaxation of the fastener tension (for example, an adjustable, separable joint that can be used to deploy items or that can be used to secure and/or release doors such as for landing gear openings for aircraft and/or openings for underwater submersible vehicles).

This application describes a fastening system with two eccentric elements. One element includes two conical surfaces, while the other element includes one conical surface.

DETAILED DESCRIPTION OF THE INVENTION

Compared to the prior art, the use of conical surfaces in a fastening system has several advantages. The addition of the conical surfaces allows the bushings to translate along the fastener axis until the surfaces contact. As the fastener is further tightened, the conical elements wedge into their respective seats and the joint becomes radially and axially preloaded (much like storing energy in a spring). The radial and axial preload increases the joints ability to manage vibration and/or shock loads. Additionally, since the conical surfaces seat, there is no clearance to allow joint slippage at those interfaces. The conical features allow the joint to easily come apart, depending on the half cone angle, in the event of needed rework. (Note: A specially designed expanding collet puller may be required for separation of a lockable joint.) The described fastening system includes two axis eccentricities and several conical mating surfaces. The conical surfaces have several advantages over prior art cylindrical surfaces, including 1) elimination of joint clearances, 2) the ability to preload (i.e., pre-stress) the joint and 3) the ability to manage high shear loads in high vibration and/or shock environments.

Figure 1:
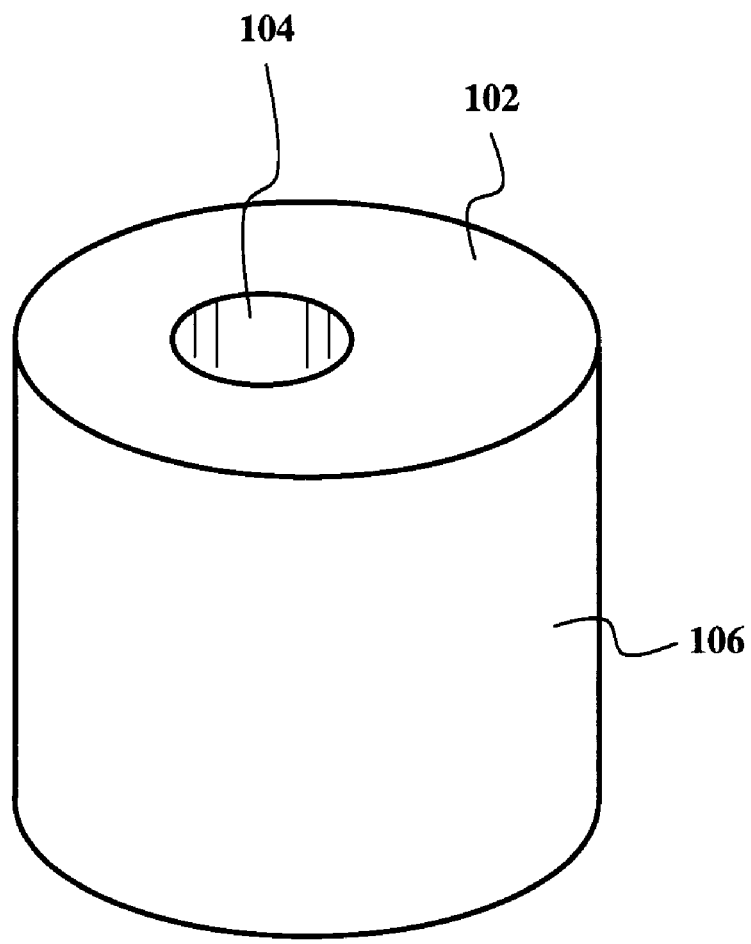
FIG. 1 shows a prior art single eccentric cylinder.
Figure 2:
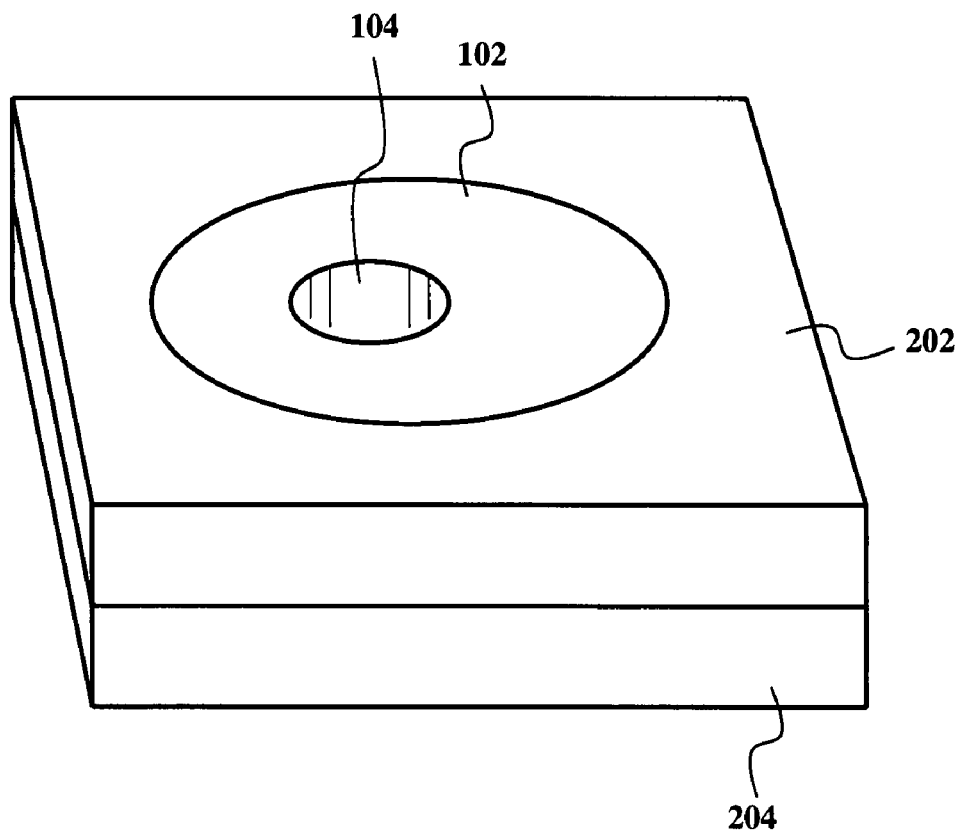
FIG. 2 shows a prior art single eccentric fastening.
Figure 3:
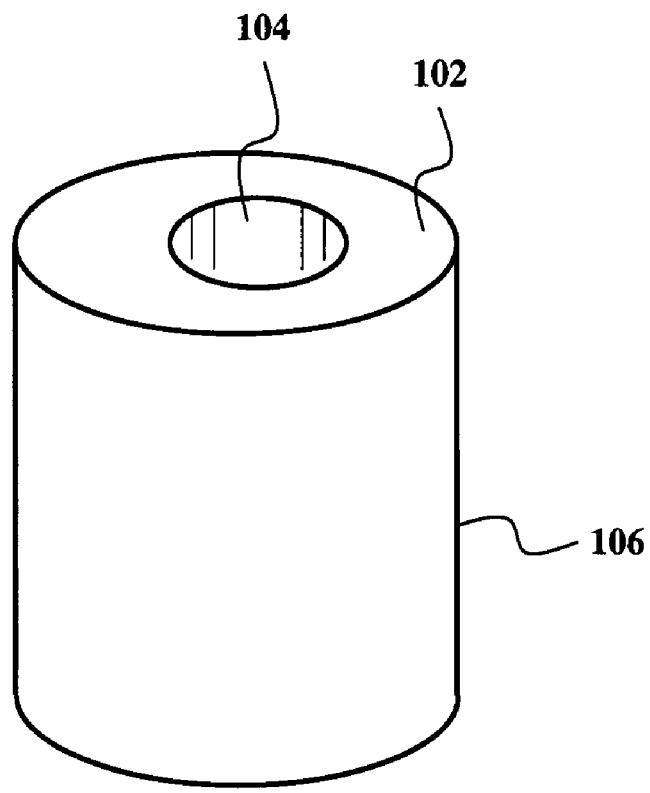
FIG. 3 shows a prior art double eccentric cylindrical fastening system.
Figure 3:
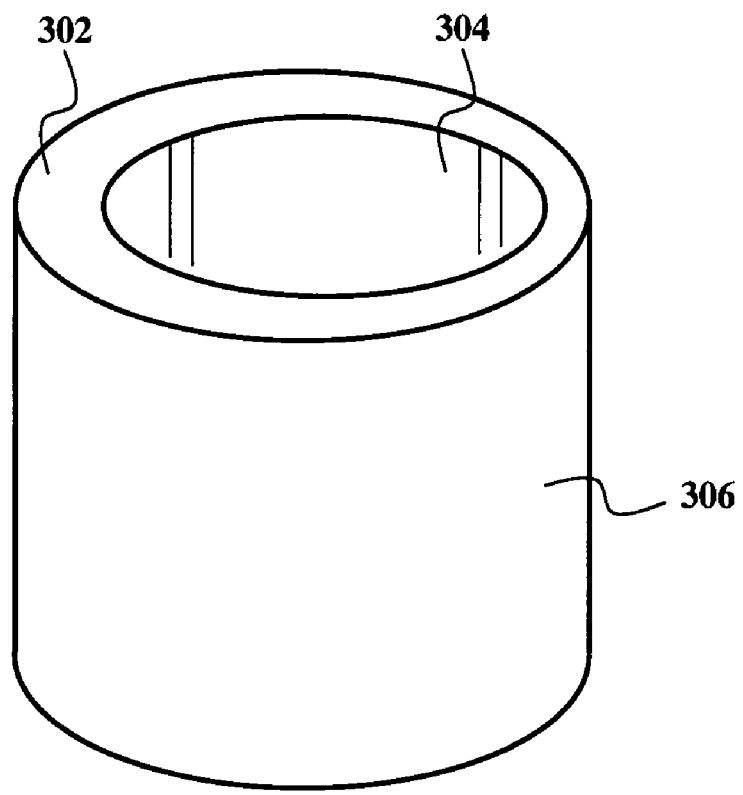
Figure 4:
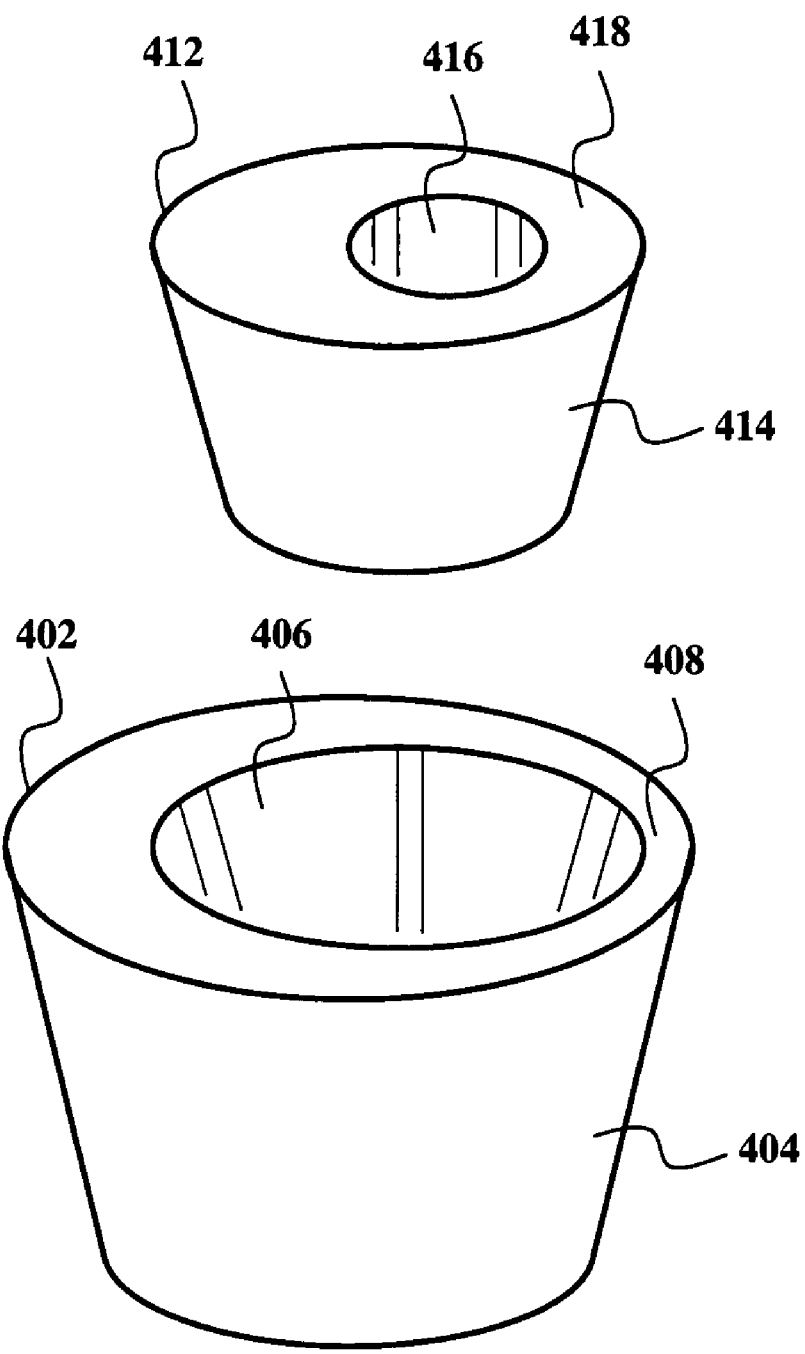
FIG. 4 shows an example of a double eccentric conical fastening system.

FIG. 4 shows an example of the double eccentric conical fastening system. A first conical element 402 has an outer conical surface 404, an inner conical surface 406, and a top surface 408. The outer and inner conical surfaces 404, 406 have axes that are parallel but offset. Thus the first conical element 402 has an eccentric nature.

A second conical element 412 has an outer conical surface 414, a hole 416, and a top surface 418. The axes of the outer conical surface 414 and the hole 416 are parallel but offset. Thus the second conical element has an eccentric nature. The outer conical surface 414 of the second conical element 412 has substantially the same half cone angle (defined below) as the inner conical surface 406 of the first element 402.

The conical nature of the first and second conical elements 402, 412 allow the first and second conical elements 402, 412 to fit together with no radial clearance. The double eccentric nature of the elements 402, 412 allows the center of hole 416 to be positioned to anywhere from the axis of the outer conical surface 404 to the combination of the eccentric offsets of the first and second conical elements 402, 412 away from the axis of the outer eccentric surface 404 (i.e., anywhere within a circle that has a radius that is equal to the sum of the eccentric offsets).

Figure 5A:
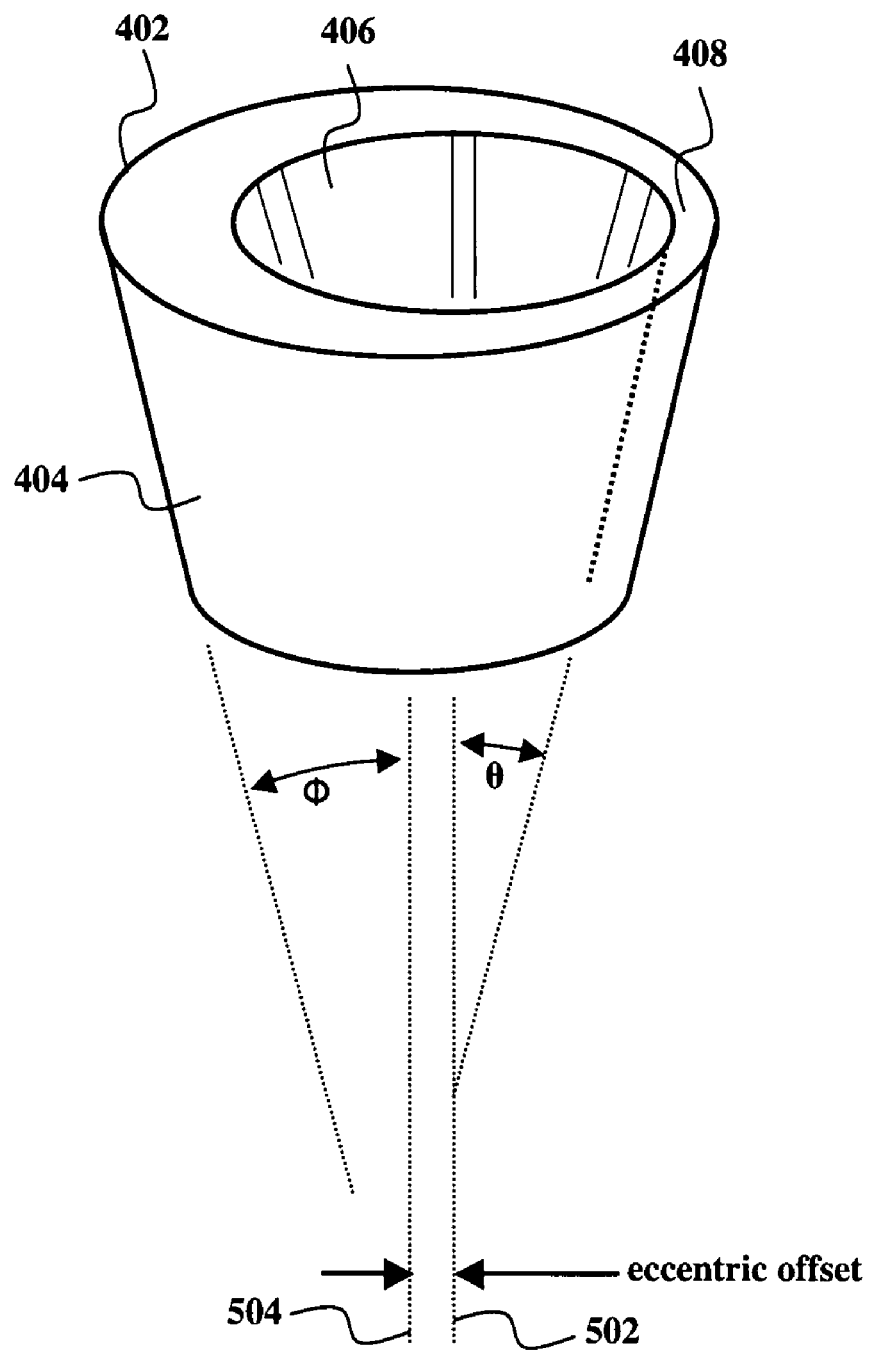
FIGS. 5a-c show conical and eccentric features.

FIG. 5a shows an example of half cone angle. The first element 402 has two associated conical angles. The outer conical surface 404 has a half cone angle relative to its axis 504. This angle is shown by $\phi$ (phi). The inner conical surface 406 has a half cone angle relative to its axis 502. This angle is shown by $\theta$ (theta). The eccentric offset is the distance between the two axes 502, 504. The top surface 408 and the bottom surface of the first conical element 402 may be perpendicular to the axis 504 or at an angle, depending on the design considerations of the system.

Figure 5B:
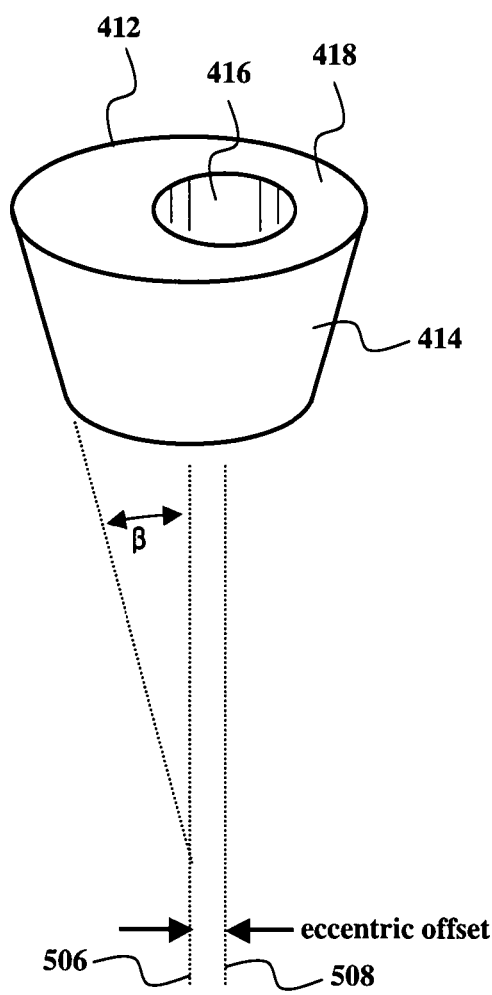

FIG. 5b shows another example of half cone angle. In this case, the outer conical surface 414 of the second conical element 412 is shown with a half cone angle, $\beta$ (beta), relative to the axis 506 of the outer conical surface 414. There is an eccentric offset between the axis 506 of the outer conical surface 414 and the axis 508 of the hole 416. The top surface 418 and the bottom surface of the second conical element 412 may be perpendicular to the axis 506 or at an angle, depending on the design considerations of the system.

Figure 5C:
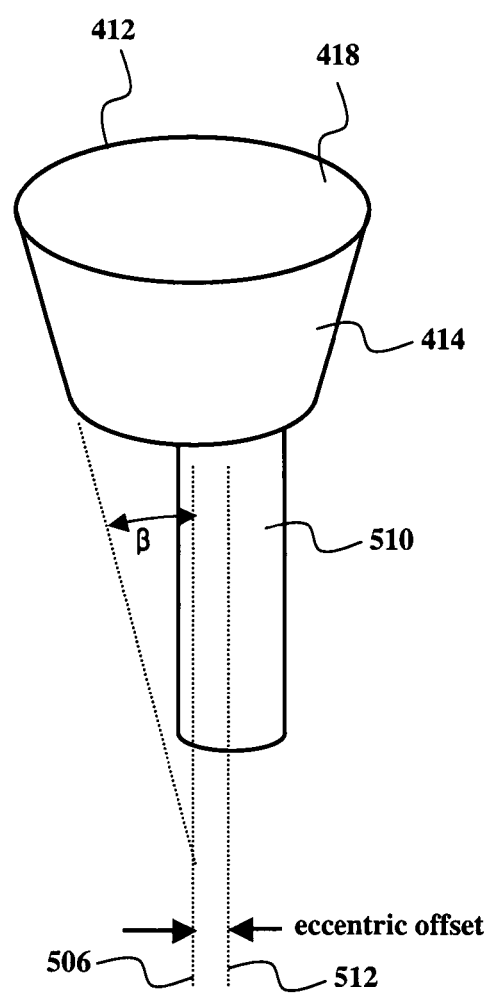

FIG. 5c shows another example of half cone angle. In this case, a different embodiment of the second conical element 412 has a fastener shaft 510 extending from its bottom surface (instead of a hole 416 as shown in FIG. 5b). In this case, there is also an eccentric offset between the single surface conical axis 506 and the fastener shaft axis 512.

The half cone angles $\phi$, $\theta$, $\beta$ (phi, theta, beta) are preferably greater than 0 degrees. A designer may want a system were the joint locks together after being torqued to specification. Half cone angles in a range of 7 to 8 degrees work well for this purpose. Angles from greater than 0 to 7 degrees may also be useful when even more locking is desired. If a designer prefers that the assembly be easily disassembled, then half cone angles greater than 8 degrees can be used. One example is a range of 15 to 60 degrees. An example of an adjustable center and separable joint is where the interior conical surface cone angle of the first element, 402, is 8° corresponding to the exterior surface half cone angle of the second element, 412, providing adjustability and a lockable section of the joint.

The exterior conical surface half cone angle of the first element may be non-locking for larger half cone angles (greater than 8 degrees for example, and even more so for angles greater than 15 degrees) and is similar to the half cone angle of the second part, 602. In this case, the joint is adjusted and torqued to specification, locking it in place, removal of the axial force via some actuator allows the joint to separate at the non-locking portion of the joint. Another benefit of this example is that the actuator can be cyclic and would allow the joint to act as an adjustable latch-on, latch off mechanism. The foregoing example demonstrates that it is not essential that all half cone angles be the same. Other examples of usable half cone angles are 5, 10, 15, 20, 25, 30, 35, 40, 45, 50, 55, 60, 65, 70, and 75 degrees.

It is preferred that the half cone angle of the conical surfaces that mate be substantially the same. Thus, it is preferred that half cone angle of the inner conical surface 406 of the first conical element 402 be substantially the same as the half cone angle of the outer conical surface 414 of the second conical element 412. Likewise, it is preferred that half cone angle of the outer conical surface 404 of the first conical element 402 be substantially the same as the half cone angle of the outer conical surface of the part that the outer conical surface 404 mates with.

The following should be considered when viewing FIGS. 6-9: (1) clearances shown are greatly expanded to assist conceptual understanding of joint (in real practice the clearances would be minimized), and (2) bottom surfaces of conical elements 402 and 412 desirably do not contact fixed part 604 (i.e., the conical elements desirably seat properly so that joint can be preloaded).

Figure 6:
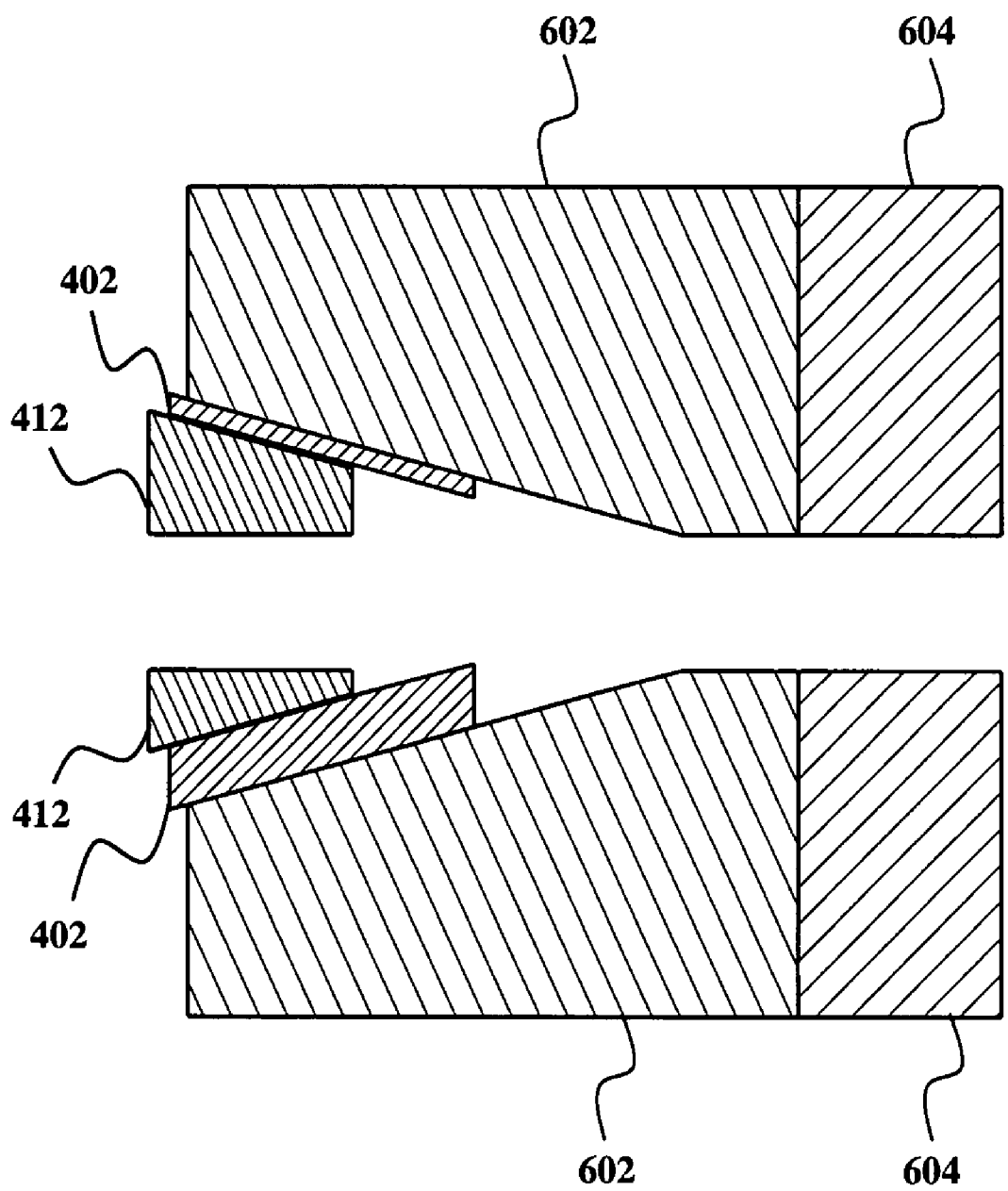
FIG. 6 shows an example of a cross-sectional view of and eccentric conical adjustment system without fastener.

FIG. 6 shows an example of a double eccentric conical fastening system. This view is a cross-section. A first fixed part 602 and a second fixed part 604 are shown. The first and second parts 602, 604 are fastened together with the double eccentric conical fastening parts. The first and second parts 602, 604 are fixed relative to each other with the system is fastened, but the parts 602, 604 may be moved relative each other with the system is unfastened. The first element 402 has an inner conical surface and an outer conical surface. The second conical element 412 has an outer conical surface that mates with the inner conical surface of the first element 402. Distances between the various elements shown in FIG. 6 may not be to scale. For example the first element 402 may be much closer to the second part 604 than is shown. Various methods of attaching the parts are shown in the following figures and described below.

Figure 7:
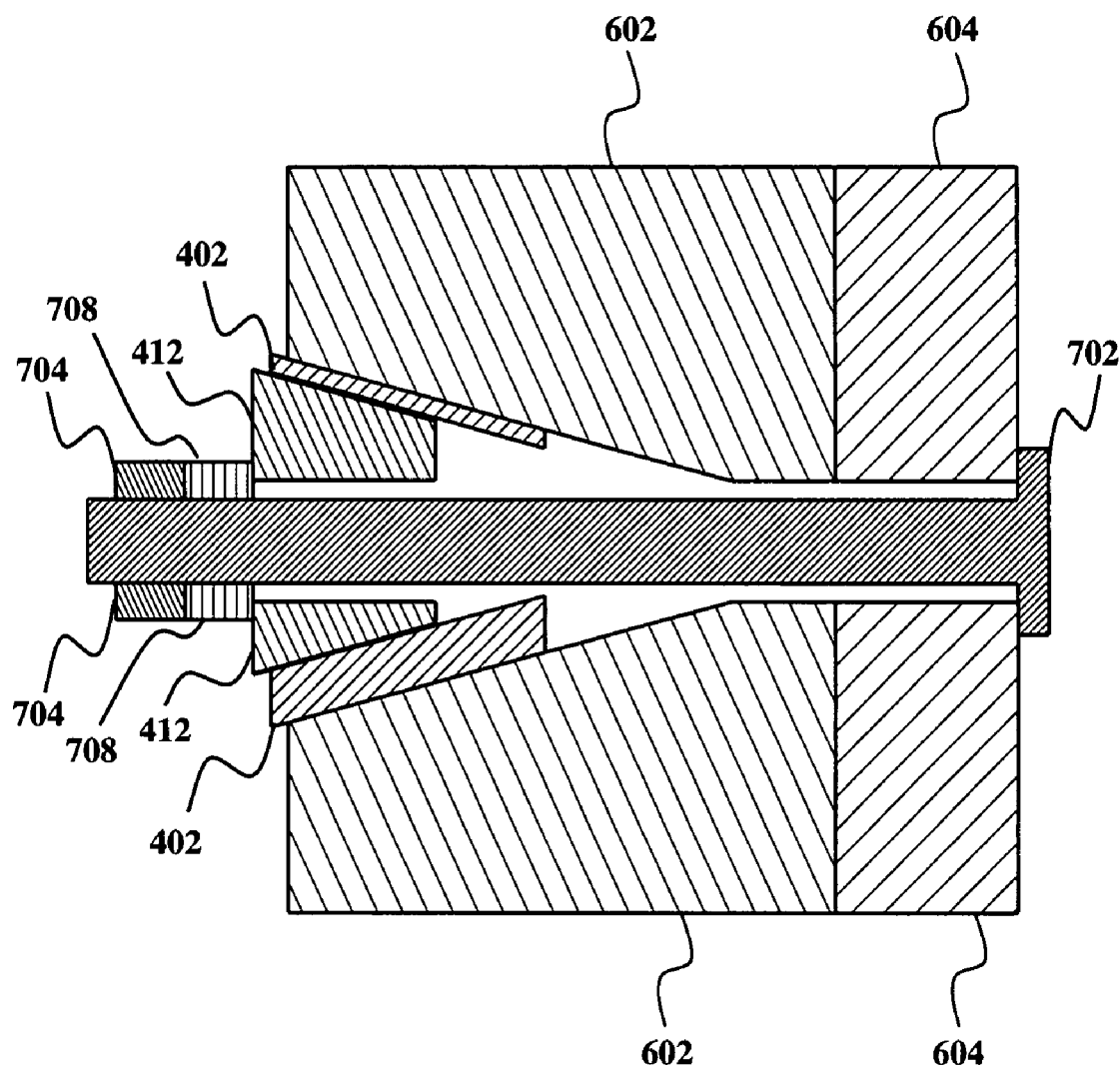
FIG. 7 shows an example of a cross-sectional view of and eccentric fastening system.

FIG. 7 shows an example where the assembly shown in FIG. 6 is fastened together with a bolt 702 and a nut 704. An optional torque reaction/limiting element 708 goes in between the second element 412 and the nut. For the purposes of this application, a torque reaction/limiting element may also be referred to as a torque limiting element. The nut 704 (or the optional torque reaction/limiting element 708, if used) contacts the second conical element 412, but does not contact the first element 402. This is desired so that any tightening force applied by the nut 704 translates to the second element 412, which translates the force into the first element 402. The first element 402 translates the force into first part 602 (i.e., force from the nut causes second element 412 to seat into the first element 402 and first element 402 to seat into the first part 602). The optional torque reaction/limiting element 708 is advantageous to prevent either of the conical elements 402, 412 from rotating. Rotating can not only ruin the adjustment, but worse than that, it can induce almost pure shear pre-stress into the fastener that can be cut via a scissor action with application of cyclic shear forces (e.g., vibration and/or shock environments). Placement of a torque reaction/limiting element 708 between the second conical element 412 and the nut 704 allows the nut 704 to be tightened without applying a moment to the second conical element 412.

Figure 8:
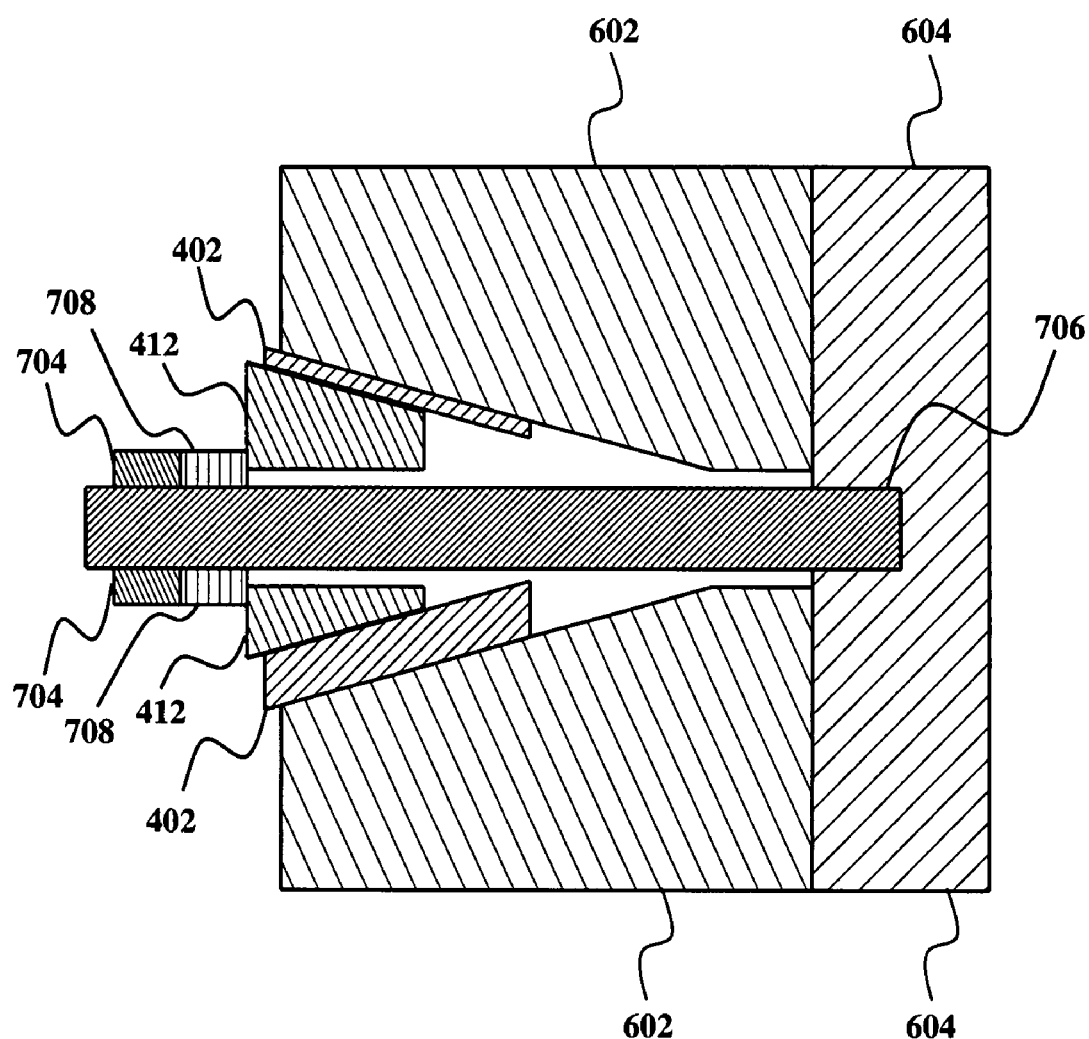
FIG. 8 shows an example of a cross-sectional view of and eccentric conical fastening system with a stud in one of the parts.

FIG. 8 shows another example of the assembly shown in FIG. 6. In this case, a stud 706 is threaded into the second part 604. A nut 704 threads on to the stud 706 to fasten the assembly. In contrast to what is shown in FIG. 7 where the second part 604 has a through hole to accommodate the bolt 702, the second part 604 in FIG. 8 is threaded to receive the stud 706. This approach further reduces clearances between cylindrical features of the joint by doing away with one interface between two cylindrical surfaces.

Figure 9:
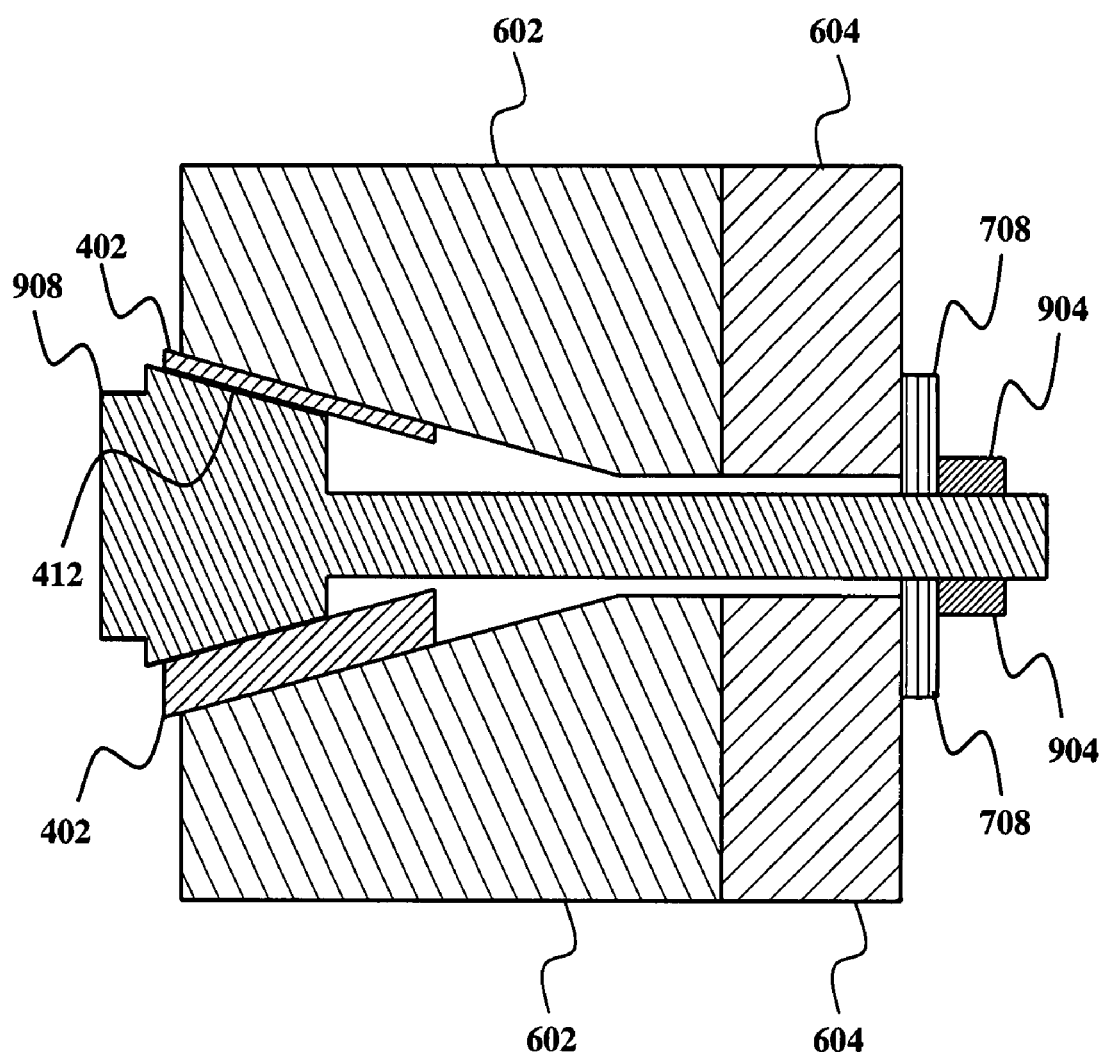
FIG. 9 shows an example of a cross-sectional view of and eccentric conical fastening system with the fastener an as integral part of the Single Surface Conical Element.

FIG. 9 shows an example of the fastening system with a second conical element that has an integral shaft that can be used for fastening, or to connect an actuator. In this example, the second conical element 412 has an integral shaft that receives a nut 904. Also shown is an optional torque reaction/limiting element 708. Optional rotation drive enabling features 908 allow the second conical element 412 to be easily rotated relative to the parts 602, 604 and the first conical element 402. The rotation drive enabling feature 908 may be a protrusion or a depression in the top surface (left side in this figure) of the second conical element 412. Other types of rotation drive enabling features might exist on the sides of the first conical element 402 (which would be radially about first element 402 at the left most side of first element 402 as shown in FIG. 9).

Figure 10A:
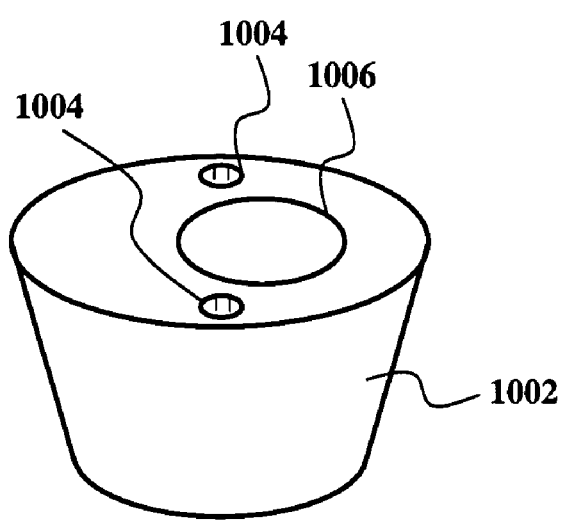
FIGS. 10a-d show examples of Rotation Drive features.

FIG. 10a shows an example of rotation drive enabling features on the second element 412. The rotation drive enabling features may be for either the first conical element 402 (which has two conical surfaces) or the second conical element 412 (which has one conical surface). For FIGS. 10a-d, the generic element 1002 shows how the rotation drive enabling features may be applied to either the first conical element 402 or the second conical element 412. In FIG. 10a one or more depressions 1004 are in the top surface of the element 1002. The depressions 1004 may be of any shape, but holes are very easy and inexpensive to machine. The interior surface 1006 of the element 1002 is minimally affected by the depressions 1004.

Figure 10B:
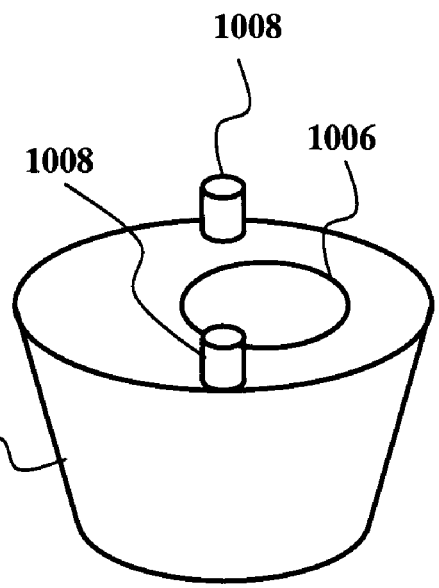

FIG. 10b shows the element 1002 with one or more rotation enabling protrusions 1008. The protrusions 1008 may be cylindrical or faceted in nature.

Figure 10C:
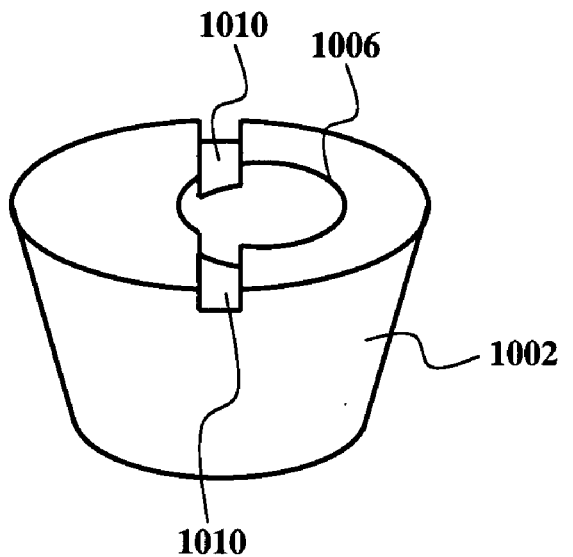

FIG. 10c shows the element 1002 with machined slots 1010. The slot 1010 allows the element 1002 to be easily rotated with a flat instrument, such as a screwdriver or with a specially designed, or standard, spanner wrench. The slot 1010 is also inexpensive to manufacture.

Figure 10D:
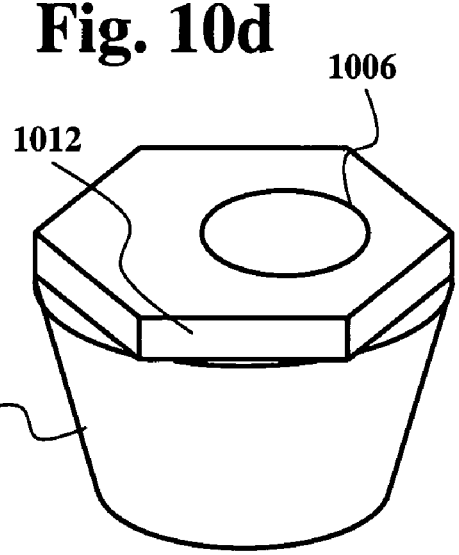

FIG. 10d shows the element 1002 with one or more rotation drive enabling features 1012 on the side of the element 1002 at either end. The features 1012 may be flat or curved. One example is to machine a six sided set of features 1012. In this case, where the faces of the features are substantially parallel to the axis of outer conical surface, the top of the element 1002 would appear and act like a nut. In another example, the set of features 1012 may be machined with one or more spline faces.

Figure 11:
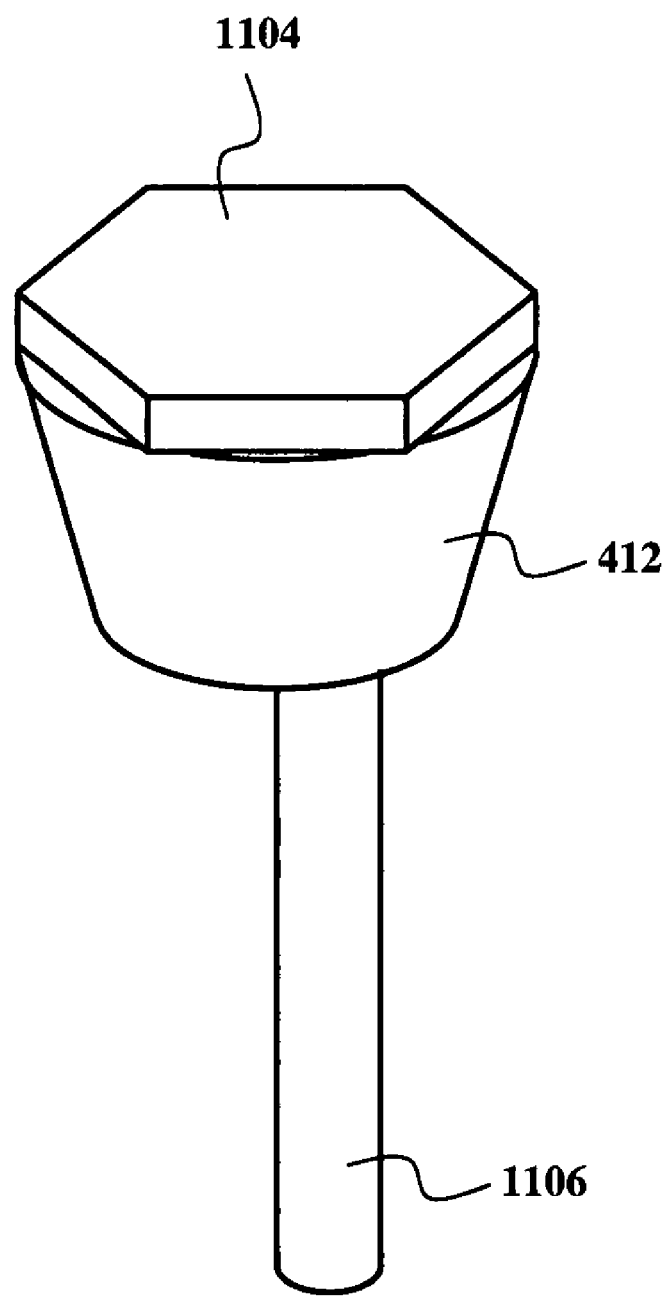
FIG. 11 shows an example of a Single Conical Surface element with an integral shaft.

FIG. 11 shows another embodiment of the second conical element 412. In this case, the second conical element 412 does not have a hole through it. Instead, the second conical element 412 has an integral shaft 1106. The shaft 1106 is desirably "ended" for receiving a nut, or for attachment to an actuator system. An optional feature 1104, which can be a torque reaction/limiting and/or a rotation drive enabling feature, is shown on the top of the second conical element 412. If the feature 1104 is used as a torque reaction/limiting feature, then a separate torque reaction element 708 may not be needed. Of course, it is possible to use a torque reaction/limiting feature as a rotation drive enabling feature as well.

Figure 12A:
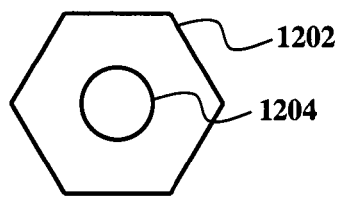
FIGS. 12 a-d show examples of Torque Reaction/Limiting features.
Figure 12A:
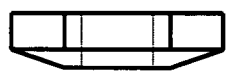

FIG. 12a shows an example of a torque reaction/limiting element 1202. The torque reaction/limiting element 1202 has a hole 1204 for passing through a shaft or bolt. The torque reaction/limiting element 1202 has one or more faces that allow a moment to be applied to the element 1202. The faces may be flat or curved.

Figure 12C:
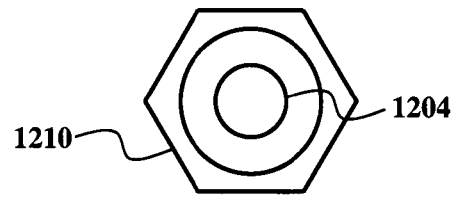
Figure 12B:
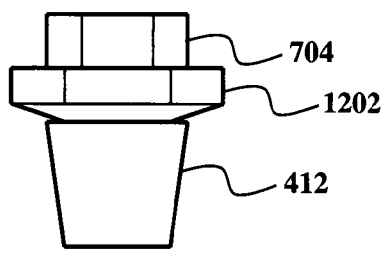

FIG. 12b shows a side view partial assembly. The assembly has a nut 704, a torque reaction/limiting element 1202, and a second conical element 412. The second conical element 412 has a single conical exterior surface.

FIG. 12c shows another example of a torque reaction/limiting element 1210. The torque reaction/limiting element 1210 has a hole 1204 for passing through a shaft or bolt. The torque reaction/limiting element 1210 has one or more faces that allow a moment to be applied to the element 1210. The faces may be flat or curved. The faces may extend for the entire length of the torque reaction/limiting element 1210, or they may extend for a smaller portion as shown in FIG. 12c.

Figure 12D:
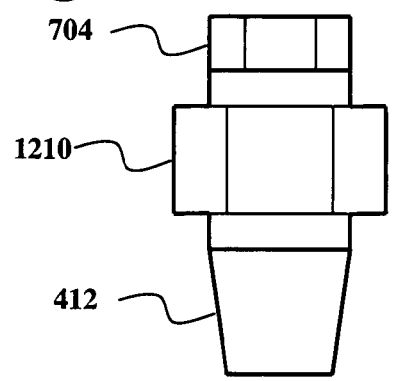

FIG. 12d shows another side view partial assembly example. The assembly has a nut 704, a torque reaction/limiting element 1210, and a second conical element 412.

Figure 13:
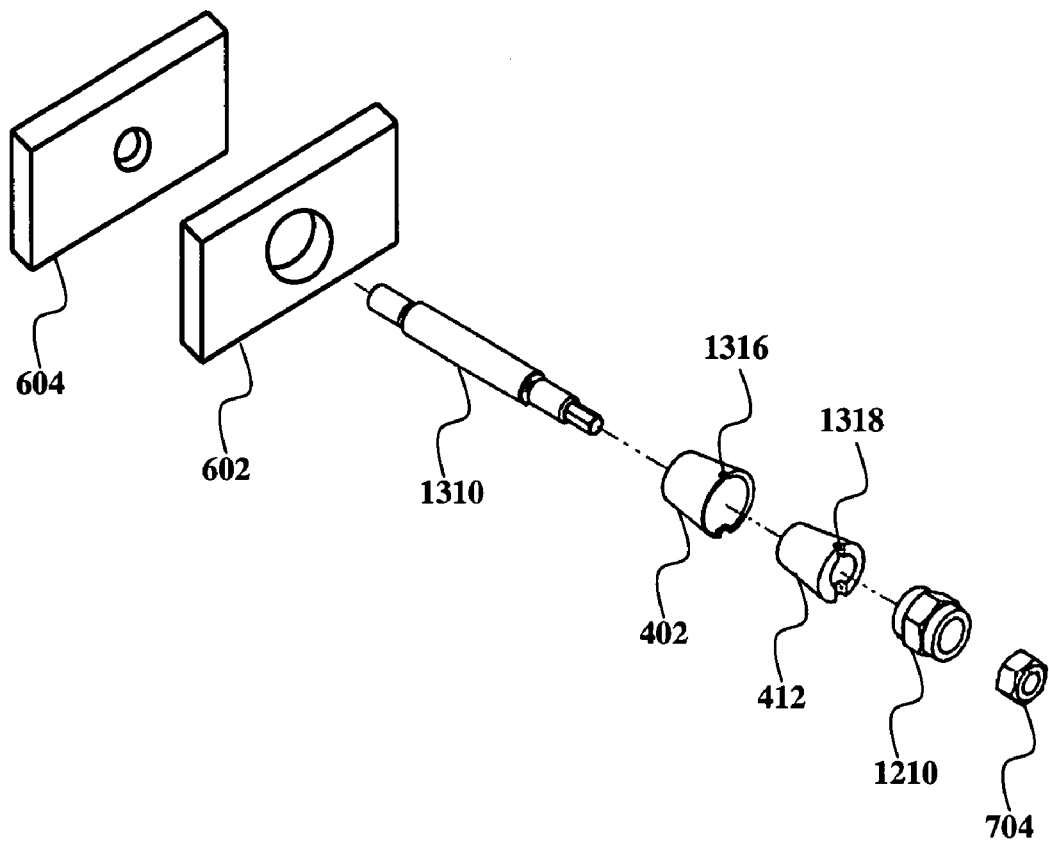
FIG. 13 shows an example of a fastener assembly.

FIG. 13 shows an exploded assembly example of a double eccentric conical fastening system. The assembly includes a first eccentric conical element 402, a second eccentric conical element 412, a torque reaction/limiting element 1210, a nut 704, a shaft 1310, a first part 602, and a second part 604. The first eccentric conical element 402 is shown with optional rotation drive enabling features 1316. Likewise, the second eccentric conical element 412 is shown with optional rotation drive enabling features 1318. In this example, the shaft 1310 threads into the second part 604. The shaft goes through the first part 602, the eccentric conical elements 402, 412, the torque reaction/limiting element 1210, and receives the nut 704. The first part 602 has an inner conical surface to receive the first eccentric conical element 402.

Figure 14:
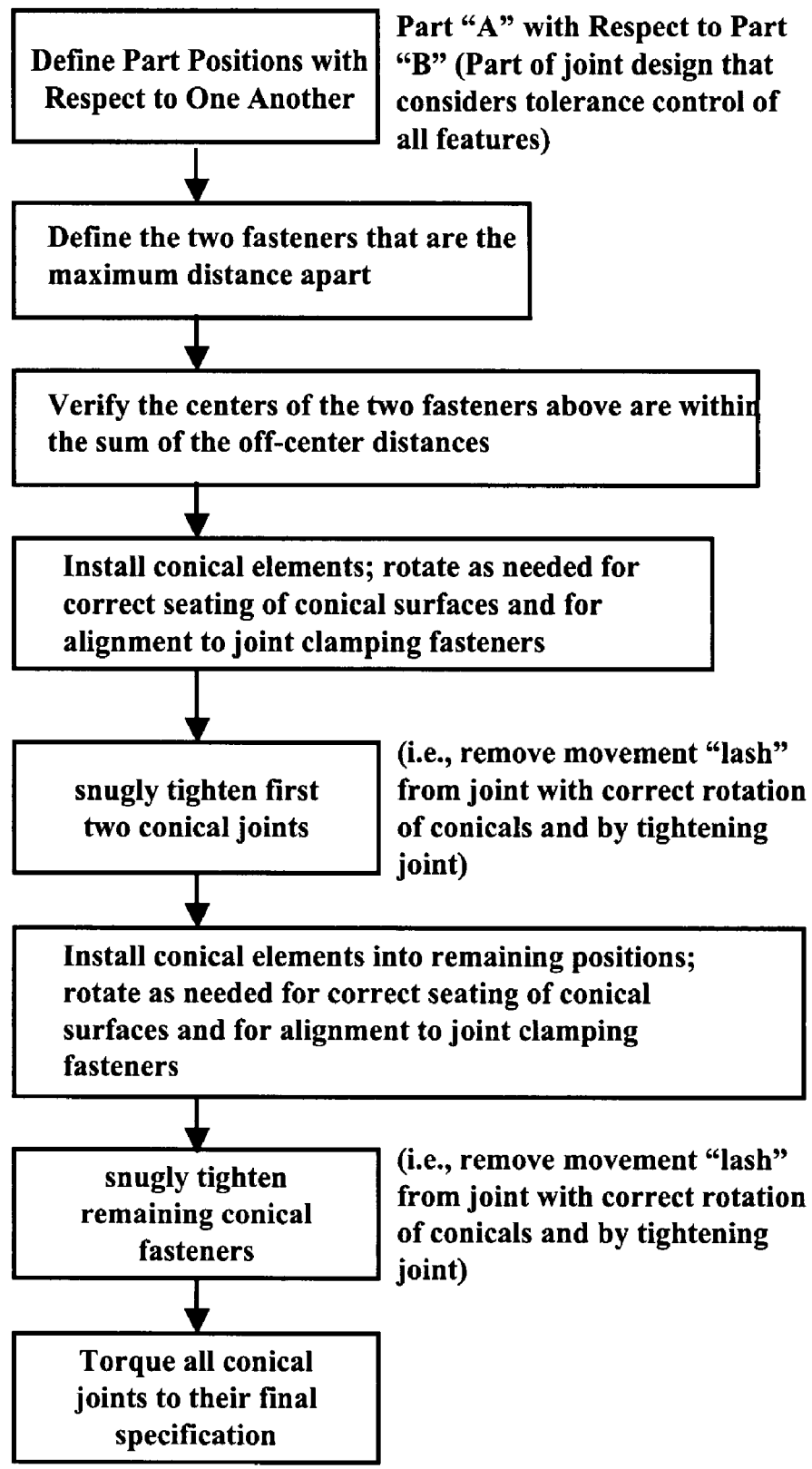
FIG. 14 shows an example of a fastening method.

FIG. 14 shows an example of a method for assembling a double eccentric conical fastening system. For assembly, the first and second parts are brought together and aligned to desired relationship with respect to one another. The technician then identifies the two conical fasteners that are the greatest distance apart. The technician then validates that the centers of those two furthest apart fasteners are within the adjustment range of the joint (i.e., within a circle whose radius is equal to the sum of the off-center distances). Preferably without changing the relationship between the first and second parts, the technician installs the first element and then rotates and/or counter-rotates the conical elements until alignment is achieved with respect to the specific fastener center. At this point the technician installs the torque reaction limiting feature, as/if needed, installs the nut and tightens that specific fastener. This process is repeated for the second conical fastener set. At this point the first part is held securely to the second part and the remaining conical fasteners can be adjusted into position quite quickly and subsequently tightened. After all conical fasteners have been adjusted, seated, and snugly tightened, they can be brought up to final torque specification using a criss-cross pattern working from the inner most fasteners outward.

Suitable materials for the first and second conical elements 402, 412 include high strength plastic, steel, aluminum, brass, and titanium. Other materials may also be appropriate. The conical elements 402, 412 may be made of similar or dissimilar materials.

Another embodiment is an actuated separable joint with nested eccentric conical elements.

It will be apparent to one skilled in the art that the described embodiments may be altered in many ways without departing from the spirit and scope of the invention. Accordingly, the scope of the invention should be determined by the following claims and their equivalents.

What is claimed is:

1. A precision adjustment joint fastening system comprising:
   a. a first element, said first element comprises:
      i. a first element top surface;
      ii. a first element bottom surface, wherein said bottom surface is parallel to said top surface;
      iii. an outer surface comprising a first conical surface having a first constant angle between said first element top surface and said first element bottom surface, the diameter of said first conical surface decreasing between said first element top surface and said first element bottom surface, wherein said first conical surface has a first conical center axis normal to said first element top surface and said first element bottom surface; and
      iv. a through bore comprising a second conical surface having a second constant angle between said first element top surface and said first element bottom surface, the diameter of said second conical surface decreasing between said first element top surface and said first element bottom surface, wherein said first constant angle is different from said second constant angle, wherein said second conical surface has a second conical center axis that is parallel to said first conical center axis, and said second conical center axis is offset from said first conical center axis;
   b. a second element, wherein said second element comprises:
      i. a second element top surface;
      ii. a second element bottom surface, wherein said second element top surface is parallel to said second element bottom surface;
      iii. an outer conical surface having said second constant angle between said second element top surface and said second element bottom surface, wherein said outer conical surface has an outer conical center axis normal to said second element surfaces; and
      iv. a first through hole, wherein said first through hole is through said second element top surface and said second element bottom surface, wherein said through hole is offset from said outer conical center axis, and said through hole is parallel to said outer conical center axis;
   c. torque reaction features disposed on said first element top surface and said second element top surface, wherein said torque reaction features comprise at least two surfaces parallel to said conical center axes, wherein said torque reaction features enable precision positioning about said center axes, and holding of said first element and said second element in a desired position about said axes while securing said joint fastening system;
   d. a first fixed part, wherein said first fixed part comprises;
      i. a first fixed part top surface;
      ii. a first fixed part bottom surface; and
      iii. a through bore comprising a first fixed part conical surface having said first constant angle between said first fixed part top surface and said first fixed part bottom surface; the diameter of said first fixed part conical surface decreasing between said first fixed part top surface and said first fixed part bottom surface,
   e. a part for fixing, wherein said part for fixing is fixedly attached to said first fixed part, said part for fixing comprises:
      i. a part for fixing top surface;
      ii. a part for fixing bottom surface; and iii. a mounting hole extending between said part for fixing top surface and said part for fixing bottom surface;
f. a joint fastener;
g. a torque limiting element abutting said second element top surface for preventing rotation between said first and second elements, said torque limiting element comprising a threaded through hole for engaging said joint fastener and face that enable a moment to be applied to said torque limiting element; and
h. a threaded nut abutting said torque limiting element and engaging said joint fastener;

wherein said first conical surface of said first element is matingly received within said first fixed part conical surface, and said outer conical surface of said second element is matingly received within said first element second conical surface, and said joint fastener is disposed through said thread nut, said torque limiting element and said first through hole of said second element and extends through said first fixed part to said mounting hole of said part for fixing, said first fixed part bottom surface abutting said part for fixing top surface, wherein said second element is precisely positioned in said first element using said torque reaction features, whereby said joint fastener is tightened between said second element top surface and said part for fixing bottom surface while said second element is held stationary using said torque reaction feature;

wherein said first constant angle comprises a half cone angle greater than 8 degrees for providing a frictionally non-locking connection between said first and second elements, providing for easy disassembly when said joint fastener is released; and wherein said second constant angle comprises a half cone angle in the range of 0 to 8 degrees for providing a frictionally locking connection between said first and second elements when said joint fastener is tightened to a desired torque.

2. The system of claim 1, wherein said first constant angle conical surfaces have half cone angles in a range of 7 to 8 degrees.

3. The system of claim 1, wherein said torque reaction features comprise depressions.

4. The system of claim 1, wherein said torque reaction features comprise raised features.

5. The system of claim 1, wherein said torque reaction features comprise slotted features.

6. The system of claim 1, wherein said torque reaction features comprise one or more faces, whereby said faces are substantially perpendicular to said top surfaces of said first and second elements, whereas said faces are substantially parallel to an axis of said outer conical surface of said second element.

7. The system of claim 1, wherein said mounting hole is selected from a group consisting of a threaded bore hole, a threaded through hole and an unthreaded through hole.

8. The system of claim 1, wherein said joint fastener is selected from a group consisting of a threaded bolt and a threaded shaft.

* * * * *